(12) United States Patent
Berger et al.

(10) Patent No.: US 8,024,768 B2
(45) Date of Patent: *Sep. 20, 2011

(54) BROADCASTING VIDEO CONTENT TO DEVICES HAVING DIFFERENT VIDEO PRESENTATION CAPABILITIES

(75) Inventors: Adam L. Berger, Pittsburgh, PA (US); Gregory C. Schohn, Brooklyn, NY (US)

(73) Assignee: Penthera Partners, Inc., Pittsburgh, PA (US)

( * ) Notice: Subject to any disclaimer, the term of this patent is extended or adjusted under 35 U.S.C. 154(b) by 1109 days.

This patent is subject to a terminal disclaimer.

(21) Appl. No.: 11/228,971

(22) Filed: Sep. 15, 2005

(65) Prior Publication Data
US 2007/0061862 A1    Mar. 15, 2007

(51) Int. Cl.
H04N 7/16 (2006.01)
H04N 5/14 (2006.01)
G06K 9/32 (2006.01)

(52) U.S. Cl. ........... 725/146; 382/298; 382/299; 348/25

(58) Field of Classification Search .................. 345/445, 345/586
See application file for complete search history.

(56) References Cited

U.S. PATENT DOCUMENTS

| | | | |
|---|---|---|---|
| 6,357,042 B2 * | 3/2002 | Srinivasan et al. | 725/32 |
| 6,937,773 B1 * | 8/2005 | Nozawa et al. | 382/243 |
| 7,020,336 B2 * | 3/2006 | Cohen-Solal et al. | 382/204 |
| 7,421,134 B2 * | 9/2008 | Hashimoto | 382/239 |
| 7,609,855 B2 * | 10/2009 | Sada et al. | 382/103 |
| 2002/0069218 A1 | 6/2002 | Sull et al. | |
| 2004/0047471 A1 * | 3/2004 | Sawano | 380/250 |
| 2004/0120591 A1 * | 6/2004 | Brower et al. | 382/240 |
| 2004/0141067 A1 * | 7/2004 | Nakayama et al. | 348/222.1 |
| 2004/0148640 A1 * | 7/2004 | Masukura et al. | 725/135 |
| 2004/0212731 A1 * | 10/2004 | Sie et al. | 348/445 |
| 2004/0227778 A1 * | 11/2004 | Lin et al. | 345/719 |
| 2005/0212913 A1 * | 9/2005 | Richter | 348/170 |
| 2006/0050785 A1 * | 3/2006 | Watanabe et al. | 375/240.03 |
| 2007/0035665 A1 * | 2/2007 | Khare et al. | 348/586 |
| 2007/0124783 A1 * | 5/2007 | Ahiska et al. | 725/105 |
| 2008/0007731 A1 * | 1/2008 | Botchway et al. | 356/338 |

FOREIGN PATENT DOCUMENTS

KR 10-2005-0015506 * 8/2006
WO WO2007/035606    3/2007

OTHER PUBLICATIONS

Aug. 15, 2007, PCT Int'l Search Report.
Sato et al., "Video OCR for Digital News Archives", IEEE Worship on Content-Based Access of Image and Video Databases (CAIVD '98), Bombay, India, pp. 52-60, Jan. 1998.

(Continued)

Primary Examiner — Brian Pendleton
Assistant Examiner — Ryan Stronczer
(74) Attorney, Agent, or Firm — Fish & Richardson P.C.

(57) ABSTRACT

Frames of broadcast video received at a device are cropped to produce rendered frames on a display of the device, the cropping being based on both (a) a predetermined value indicating a location within each of at least some of the frames with respect to which the cropping is to be done and (b) a characteristic of the display.

10 Claims, 12 Drawing Sheets

OTHER PUBLICATIONS

Viola et al., "Robust Real-Time Object Detection", Second International Workshop on Statistical and Computational Theories of Vision—Modeling, Learning, Computing , and Sampling, Vancouver, Canada, Jul. 13, 2001.

Harville et al., "Foreground Segmentation Using Adaptive Mixture Models in Color and Depth", Proceedings of the IEEE Workshop on Detection and Recognition of Events in Video, (Vancouver, Canada), Jul. 2001.

Smith et al., "Video Skimming and Characterization through the Combination of Image and Language Understanding", IEEE International Workshop on Content-Based Access of Image and Video Databases (ICCV98—Bombay, India), 1998.

Darwin Streaming Server (from Apple): http://developer.apple.com/darwin/projects/streaming.

Helix Producer Plus (from Real Networks): http://www.realnetworks.com/products/producer.

Windows Media Encoder 9 (from Microsoft): http://www.microsoft.com/windows/windowsmedia/9series/encoder/default.aspx.

ClearStory System's ActiveMedia 6.0 Digital Asset Management: http://www.clearstorysystems.com/products-services/activemedia.html.

ThePlatform Media Publishing System: www.theplatform.com.

Jun Xin et al., "Digital Video Transcoding", Proceedings of the IEEE, vol. 93, No. 1, pp. 84-97, Jan. 2005.

International Preliminary Report on Patentability for PCT application No. PCT/US2006/036236 mailed Mar. 27, 2008 (6 pages).

\* cited by examiner

Original

Downsampling

Zooming

BROADCASTING VIDEO CONTENT TO DEVICES HAVING DIFFERENT VIDEO PRESENTATION CAPABILITIES

BACKGROUND

This description relates to broadcasting video content to devices having different content presentation capabilities.

In the case of digital video content, the devices span a wide range from projection TVs to flip-phones and others. Their display capabilities vary in terms of screen size, density of pixels, and color depth, for example. The best way to present a given video item may differ for different target devices. For example, a ticker of stock prices or sports scores at the bottom of a news video may be legible on a conventional TV set but blurred on the screen of a cell phone or personal digital assistant (PDA).

SUMMARY

In general, in one aspect, frames of broadcast video received at a device are cropped to produce rendered frames on a display of the device, the cropping being based on both (a) a pre-determined value indicating a location within each of at least some of the frames with respect to which the cropping is to be done and (b) a characteristic of the display.

Implementations may include one or more of the following features. The location comprises a centroid of a region of interest of the input digital image. The pre-determined value is received from a source external to the device. The pre-determined value is received with the input broadcast video. There is a one-to-one association of frames and pre-determined values. The cropping of each of the frames occurs in real time as the frames are received. The pre-determined values are generated remotely from the device. The device comprises a mobile device. The mobile device comprises a telephone or a personal digital assistant or a vehicle-mounted display. The characteristic of the display includes the aspect ratio of the display. The characteristic of the display includes the pixel density of the display. The rendered image includes text.

In general, in another aspect, for a frame of video to be broadcast to at least two different devices that have different capabilities for presenting the video to users, a single directive is generated based on the video, the single directive being usable at each of the devices to control the presentation of the frame in two different ways that accommodate the respective capabilities of the two devices.

Implementations may include one or more of the following features. The directive is packaged with the video for delivery together to the two devices. Each of the frames of the video is associated with a directive based on the video. At least one of the devices comprises a mobile device. Presenting the frame comprises displaying the frame to a user. The directive identifies a location of a region of interest in the frame. The capabilities of the device include a size of a display. The capabilities of the device include a density of pixels of a display. The directive is generated at a central location. The central location comprises a head-end of a mobile video broadcasting system. The mobile video broadcasting system comprises DVB-H. The directive is generated in connection with encoding of the video.

In general, in another aspect, for a frame of video to be delivered to at least two different devices that have different capabilities for presenting the frame to users, a single directive is generated based on the video, the single directive being usable at each of the devices to control the presentation of the frame in two different ways that accommodate the respective capabilities of the two devices, and at each of the two different device cropping the frame based on both the directive and a characteristic of the display.

Implementations may include one or more of the following features. The directive comprises an indication of the location of a region of interest in at least one frame of the video In general, in another aspect, a region of interest is determined in a frame of a video, and a location is determined representative of the region of interest, the location being sufficient to enable each of two different video playing devices having different display characteristics to render the frame in a manner suitable for the display characteristics of the device.

Implementations may include one or more of the following features. The location comprises a centroid of the region of interest. Such a location is determined for each of additional frames of the video. Information about the location is embedded in the video. The location is used in forming a directive stream associated with the video. The region of interest is based on foreground pixels of the image. The region of interest is based on a moving object or region in the video. The region of interest is based on pan and scan vectors of the video. The region of interest is based on a face appearing in the video. The region of interest is based on the existence of small-font text on a periphery of the frame.

Other aspects include other combinations of features and aspects recited above and other methods, apparatus, programs, and systems, and may include aspects and features in which modifications other than or in addition to cropping are performed, communication is other than or in addition to broadcast, and the content is other than or in addition to video.

Other advantages and features will become apparent from the following description and from the claims.

DESCRIPTION

Figure 4:
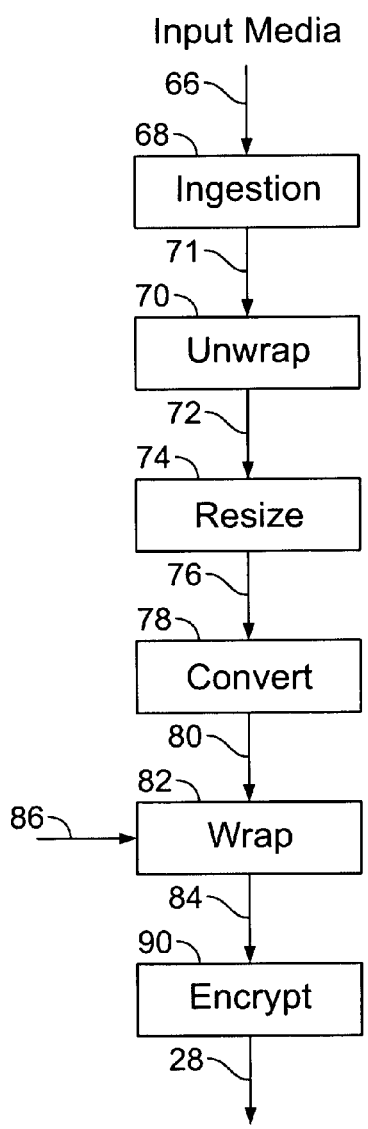
Figure 5:
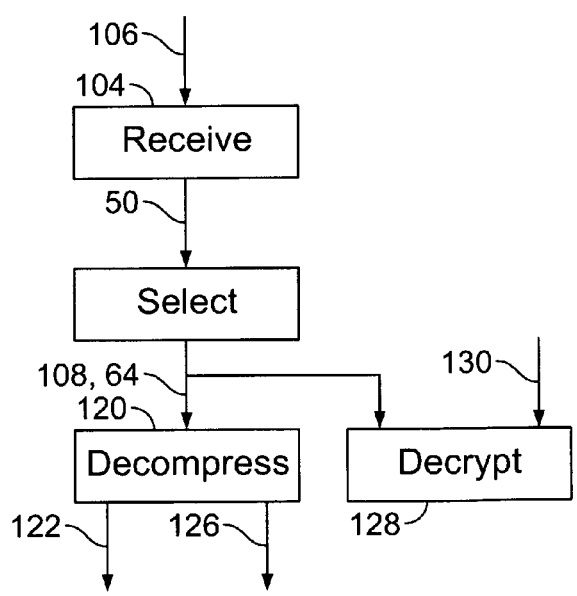
Figure 11:
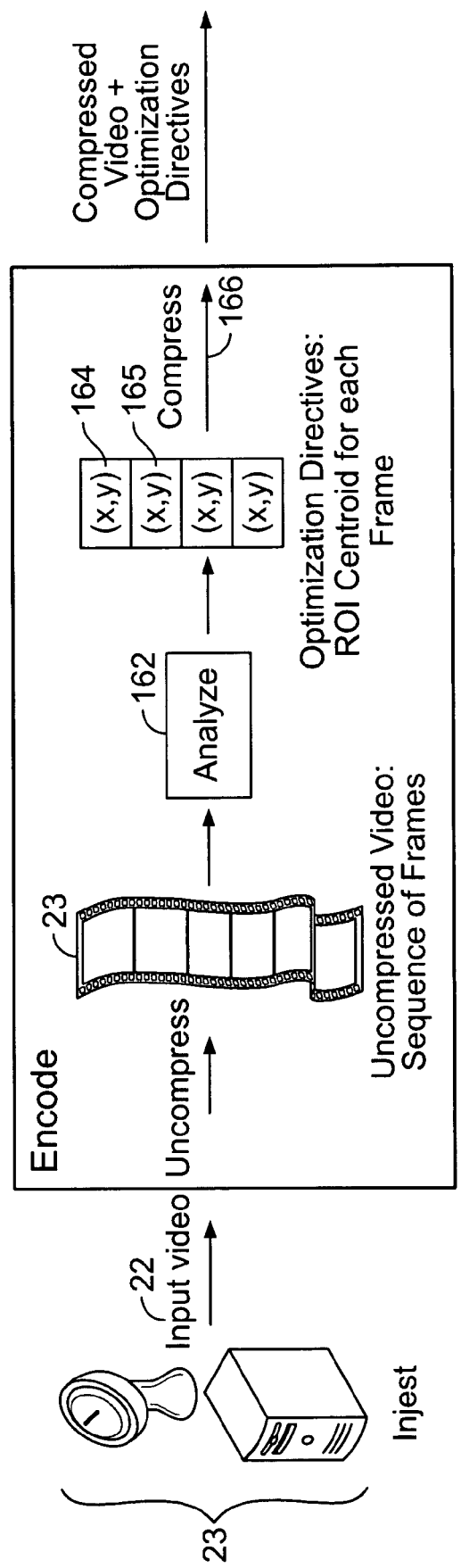

FIGS. 4, 5, and 11 are block diagrams of the handling of data.

Figure 6:
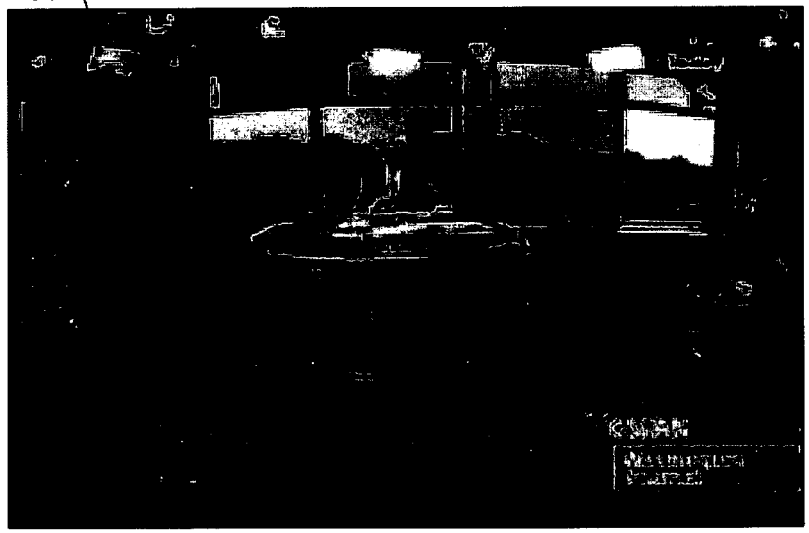
Figure 6:
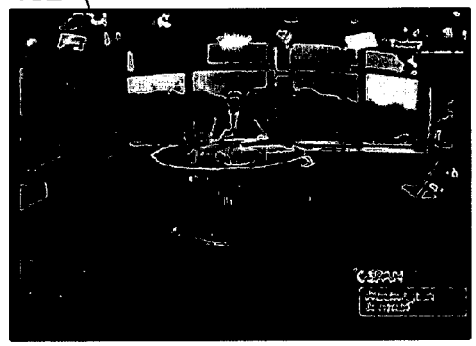
Figure 6:

FIG. 6 shows several versions of a video frame.

Figure 7:
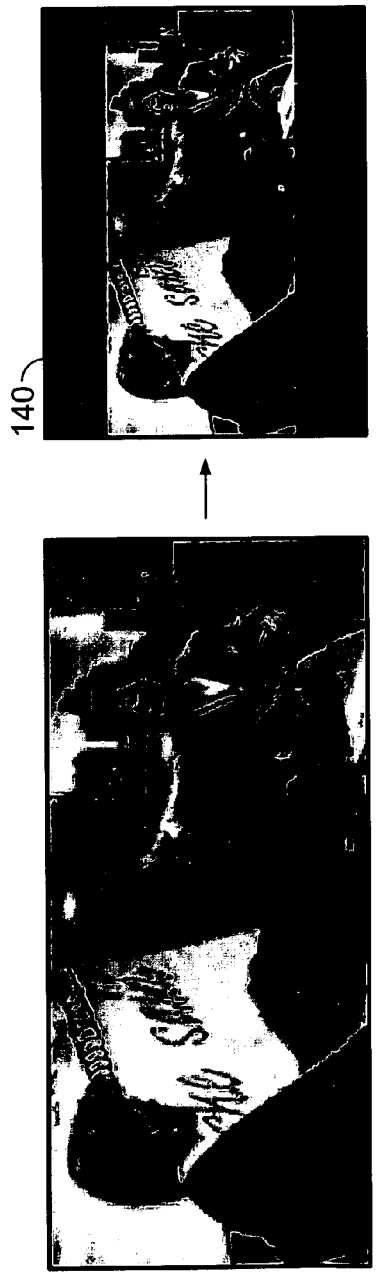

FIG. 7 shows letterboxing of a video frame.

Figure 8:
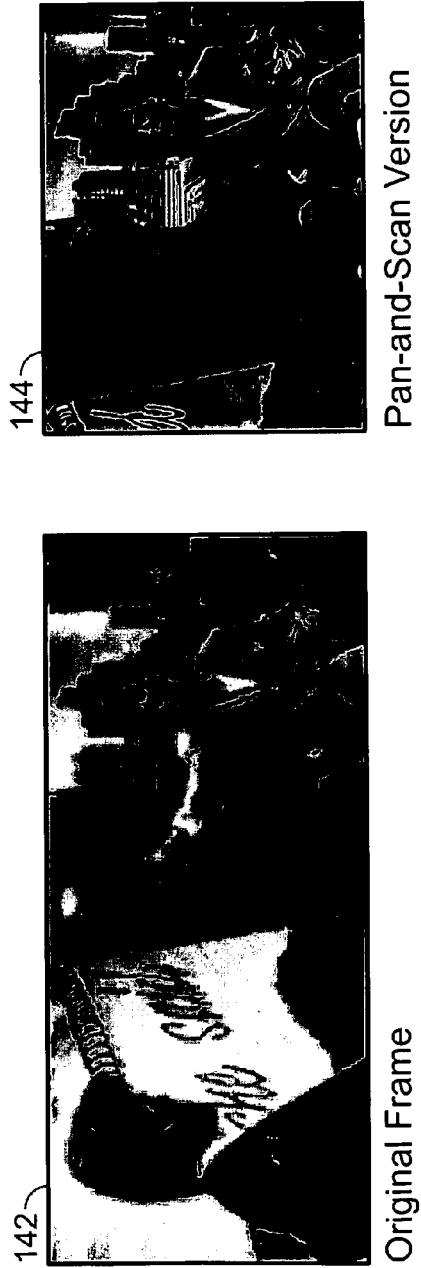

FIG. 8 shows a technique to correct letterboxing of a video frame.

Figure 9:
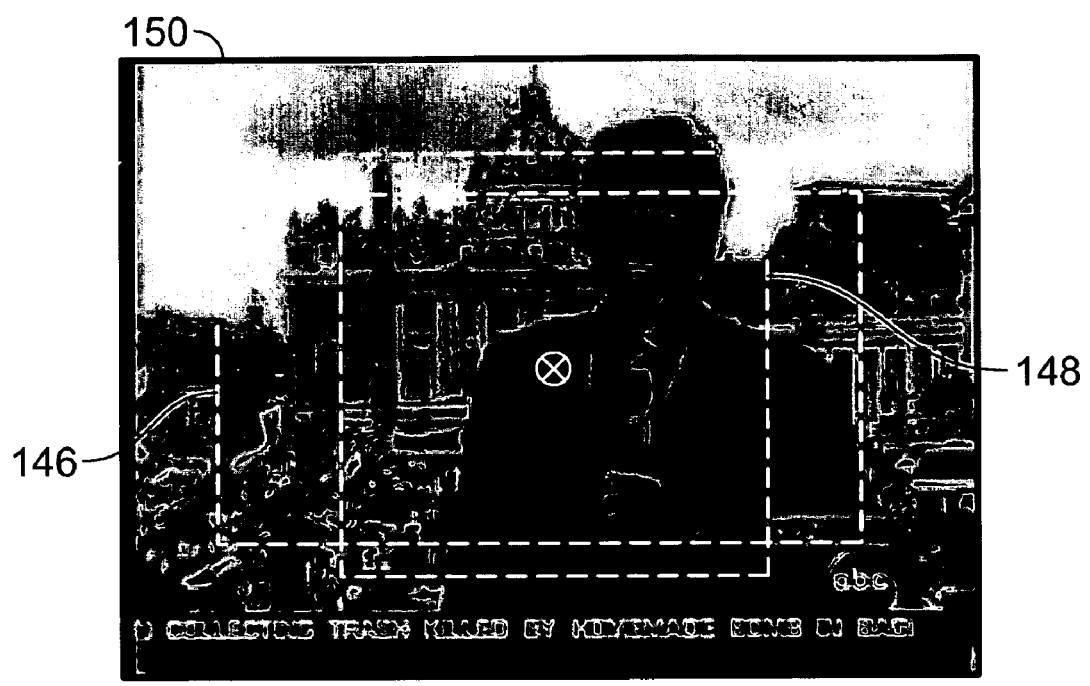

FIG. 9 shows cropping of a video frame.

Figure 12:
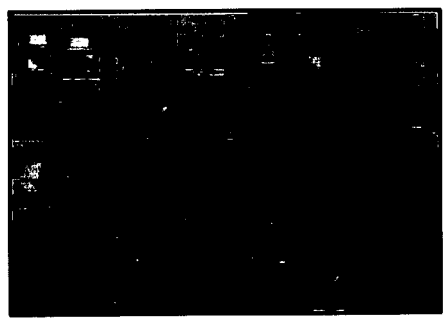
Figure 12:
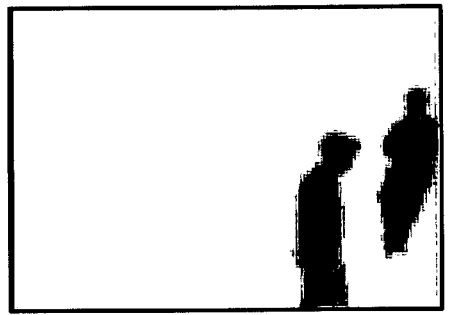
Figure 12:
Figure 12:
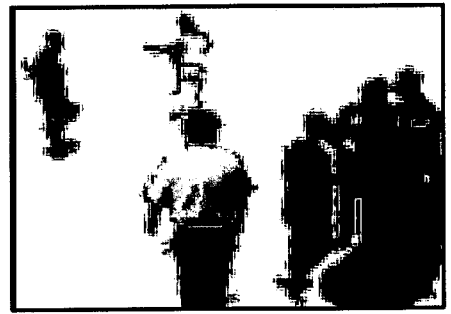

FIG. 12 shows partitioning of a video frame.

Figure 13:
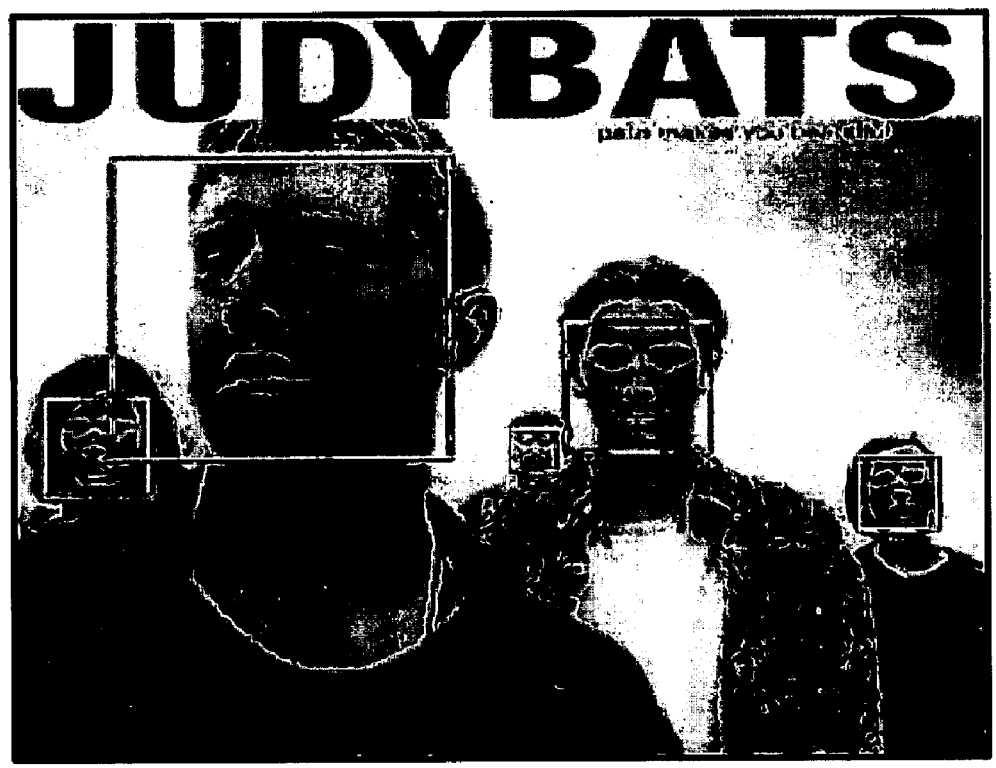
Figure 13:

FIG. 13 shows face detection.

Figure 14:
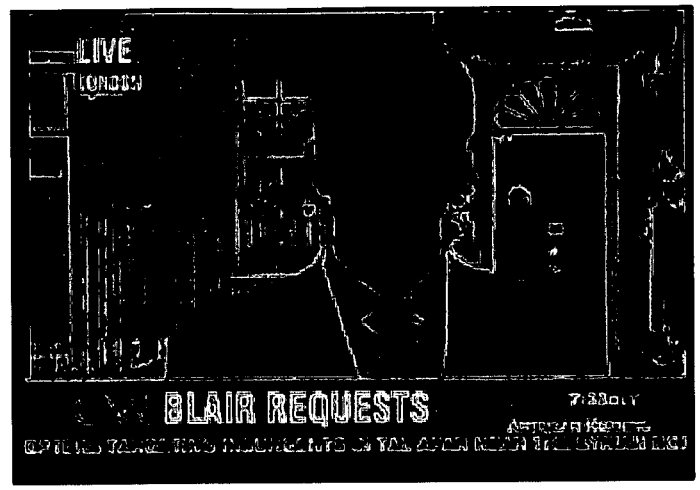
Figure 14:
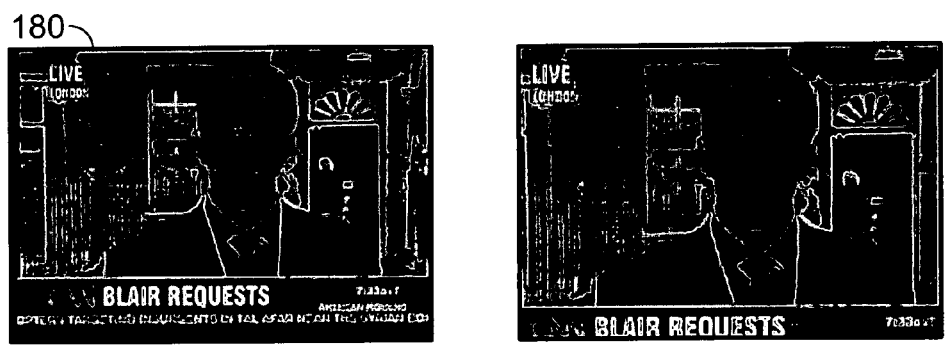

FIG. 14 shows several versions of a video frame.

Figure 15:
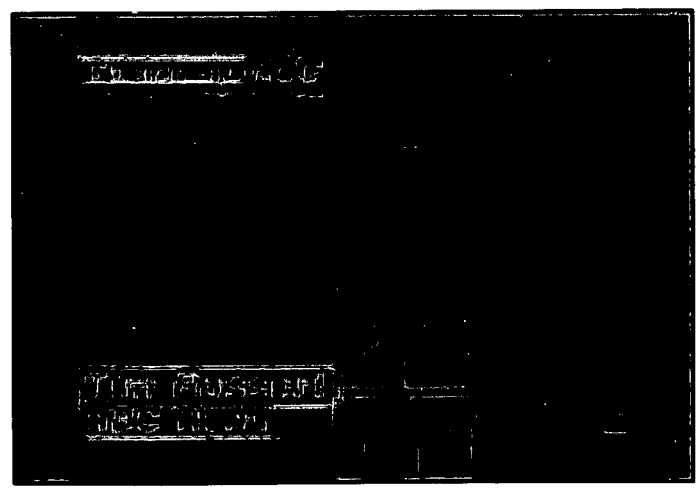

FIG. 15 shows text detection.

Figure 16:
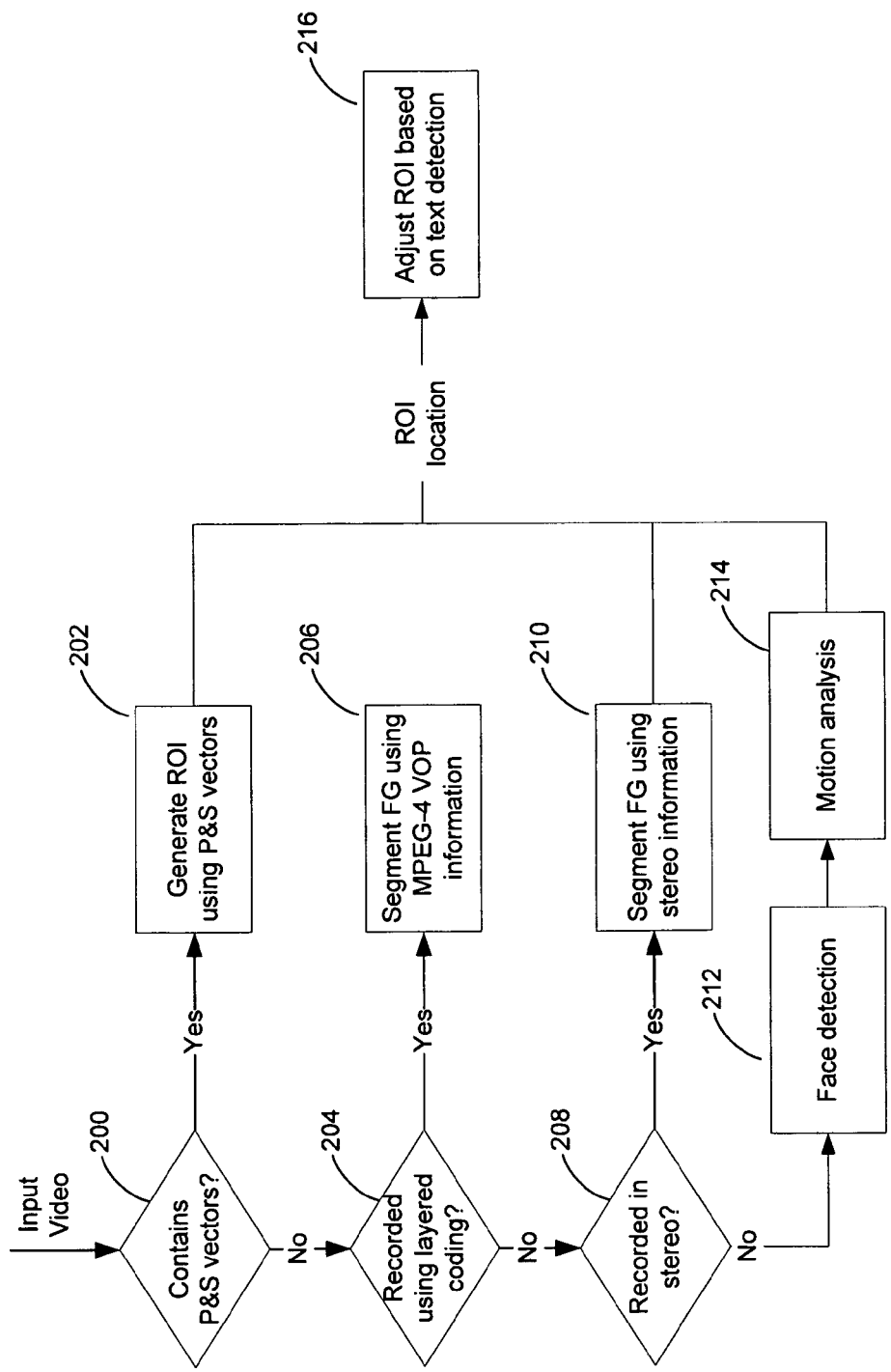

FIG. 16 is a flow chart of the handling of data.

Figure 1:
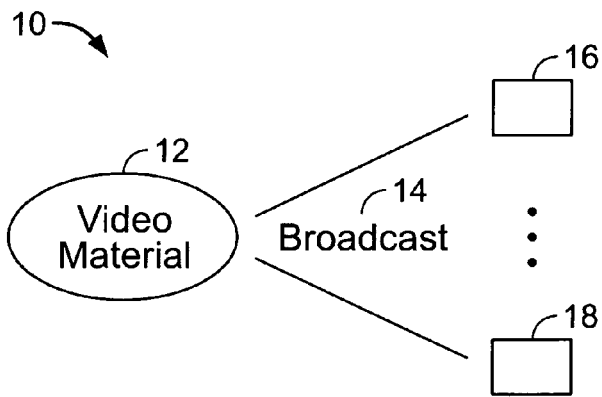
FIG. 1 is a block diagram of a broadcast.

As shown in FIG. 1, in the example of a broadcast video system 10, video material (for example, in the form of compressed digital video) 12 may be broadcast 14 to target devices 16, 18 having a range of display capabilities. By broadcast we mean, for example, a one-to-many communication in which the bearer of the communication in the network is a technology, like satellite or terrestrial transmission, that allows direct receipt by any receiver in range of the transmitter. The communication is carried to all recipients over a single, unidirectional, bandwidth-limited channel.

The video is decoded and presented at each of the devices. Such devices include, for example, small screen, mobile, video-enabled devices, such as cell phones, PDAs, handheld video players, laptop and tablet PCs, handheld game-playing devices, and other portable consumer electronic devices. By "mobile device" we mean, for example, a device that is portable: small enough to be carried in one's hand and is battery-powered, thus obviating the need for a continuously-connected external power source. Such devices come in many different configurations and with many different kinds of screens and display capabilities.

In theory, one way to serve the needs of different target devices would be for the broadcaster to transmit a video service (akin to a broadcast TV channel) in multiple versions, each version customized for a target class of device, for example: one version for 1.5"-wide cell phone screens, a second version for larger-screen PDAs, a third version for yet-larger handheld devices or those with a different form factor and/or aspect ratio, and so on. Yet broadcasting multiple versions is normally infeasible since a broadcast system has limited bandwidth. A broadcaster could in theory transmit four different versions of each video service, but in doing so, he would reduce the number of different services he could transmit by approximately three-quarters. For example, a 5 MHz band at 1.6 GHz can accommodate only about 6 Mb/s of transmission, using the DVB-H transmission standard. (Other mobile digital broadcast standards—ISDB-T, DMB-T, and FLO, for example—have similar bandwidth constraints.) Using advanced video compression algorithms (e.g., H.264 or WMV-9), a mobile broadcaster's typical available spectrum permits between ten and forty video services of high-quality video, each of 15-20 frames/second of QVGA resolution (320×240 pixels), each requiring about 300 kb/s. Reducing the number of services by some factor is an unviable business proposition.

Thus a broadcaster can afford to create only a single, generic version of each video service for transmission to an entire target population of devices and users.

In a typical mobile video broadcast center, video content is ingested from a source, converted to a suitable form for mobile use (for example, the video is resized to a smaller format and encoded in a highly-compressed file format), and broadcast. Each client decodes the received signal and presents the video to its user. As discussed earlier, any customization of the generic video signal to an individual screen must be done on each target device after the generic video signal has been received. Yet target devices—especially mobile video players—have modest computational resources and severe power constraints that limit their ability to customize the received video.

As broadcasting is a one-to-many activity in which a single packaging or head-end facility creates content for transmission to a large client population, it is efficient to add computational resources at the single head-end rather than at the large number of clients. The computational power of the packaging process can be increased easily by upgrading the packaging server. A comparable upgrade of the computational power of the clients would require in-the-field updates of hardware and/or software for potentially millions of devices.

Figure 2:
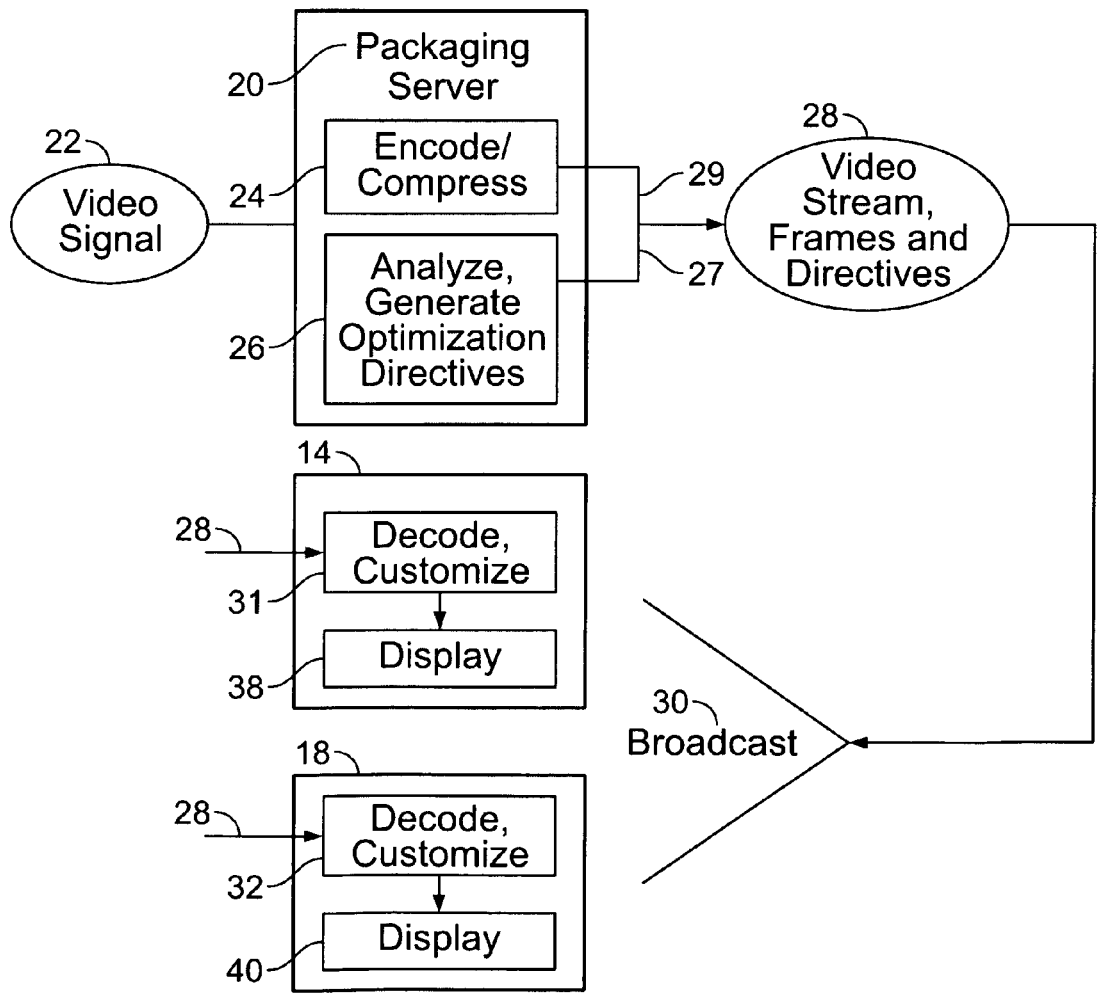
FIG. 2 is a block diagram of a staged optimization of a video signal.

As shown in FIG. 2, a so-called staged optimization of the video signal 22 can be used to take advantage of this principle: although analyzing the video signal and generating so-called "optimization directives" may require a large amount of computational power during the packaging of the video signal for broadcast, only a small amount of computational power is needed at the target device. Using staged optimization, the broadcaster need only transmit a single generic video signal. Each target device customizes the display of the video signal to suit its own capability.

At the packaging server 20, the video signal 22 is analyzed and a compact stream of optimization directives 27 is generated 26. The directives are interleaved with the video stream 29 to form a composite stream 28. The directives represent annotations that suggest to a target device how to customize the frames according to its own capabilities and the characteristics of its display. The annotations of the stream are typically broadcast 30 in-band with the video itself, although they could possibly be delivered in other ways and separately from the video stream.

At the different kinds of clients 14, 18, the received optimization directives are applied in real-time to the incoming video stream of the composite stream 28 during the decoding and customization process 31, 32. The decoded and customized signals are then sent to the respective displays 38, 40.

In some implementations, the video stream may be in Microsoft's Advanced Streaming Format (ASF), a file format designed to store synchronized multimedia data (the specification of which is available from Microsoft, for example, at http://www.microsoft.com/windows/windowsmedia/format/asfspec.aspx). This format allows arbitrary objects to be embedded at specific times in the multimedia stream—for example, hyperlinks. Applications designed to interpret and play ASF files (e.g. the Windows Media Player) recognizes these embedded objects and acts upon them or, if an object is not recognized, passes it to an external module for processing. In this latter case, an ASF file may be injected with optimization directives by interleaving data packets representing these directives within the ASF File Data Object. The optimization directive could, for example, be a signal that the central region of interest has shifted to a pixel position of (140,190) within the frame. When a player receives an optimization directive packet, an event is generated. This event will drive the player to act on this event asynchronously from its main processing of the video stream. The event could be a module that crops this and all subsequent video frames (until a new directive appears) to the size of the screen, in this case using the position (140,190) as the centroid of the crop.

The directive-creation step requires more computational capacity than the directive-processing step, because the former requires analyzing the input video.

Figure 3:
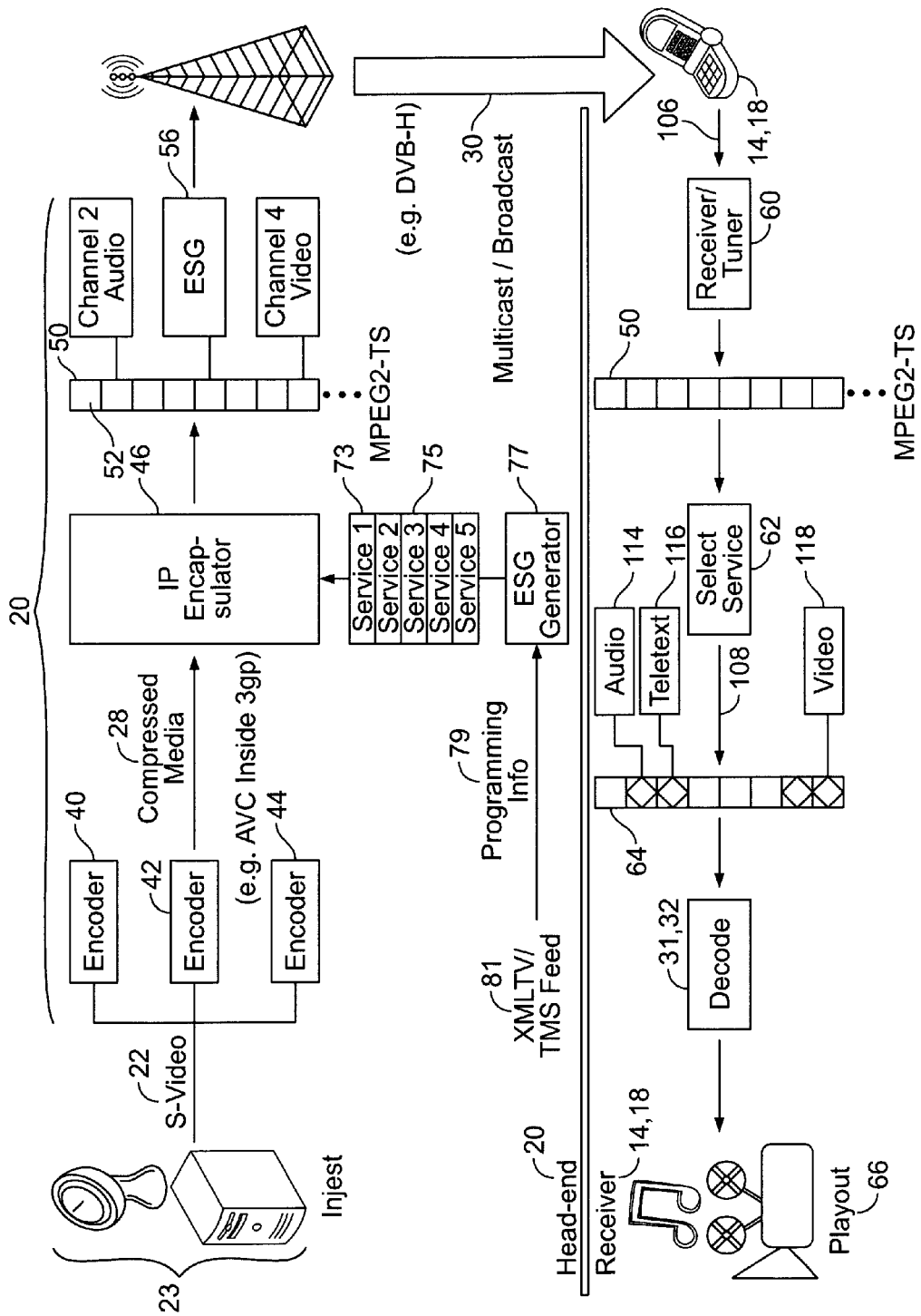
FIGS. 3 and 10 are block diagrams of a broadcasting system.

We turn now to a more detailed description of some implementations beginning with FIG. 3 in which video content is created at a production source 23, e.g., a television studio. The content is transmitted to a head end 20 using various mechanisms including satellite, high-speed dedicated fiber, or, in some cases (when the content is not intended for live broadcast) simply by commercial transport of recorded media, e.g. a DVD.

By analogy with typical cable TV network terminology, the head-end 20 is, for example, a site where multimedia services (e.g., live TV) are packaged and distributed for broadcast to mobile clients. For mobile video delivery, head-end processing occurs at a central facility sometimes called a network operations center (NOC). Typically, the NOC is equipped with redundant, reliable sources of power, space for rack-mount servers, security, and appropriate cooling facilities. We sometimes refer to the head-end or portions of it as a packaging server.

As shown in FIG. 4, after ingestion 68, the encoder prepares the input media 66 for broadcast. The encoding steps include the following. The media is unwrapped 70 from its original format 71 (e.g., MPEG-2 or NTSC) into a "raw" format 72 (in which each frame is represented as a two-dimensional bitmap of pixel values). The raw format video is resized 74 to a smaller size 76 having fewer pixels, by down-sampling or cropping or both. The resized media is converted 78 to a highly-compressed "codec" 80 (e.g., AVC or WMV-9, each of which can encapsulate video at a high frame rate, say, 15-20 frames/second, with high fidelity, using less than 300 kb/s). The codec is wrapped 82 in a file container 84 like ASF. The wrapper specifies the structure of the underlying media stream and may contain meta-information 86 such as name of the program, actors, release date, and so on. As we have discussed, the ASF format may also contain arbitrary additional objects interleaved with the media stream. Optionally, the file may be encrypted 90 using a digital rights management (DRM) package (e.g., Windows Media DRM or OMA DRM).

Encoding may be done using commercial media encoding products, such as those from Real Networks, Entera, Envivio, and Apple, which run on Windows, Macintosh, and Unix operating systems.

In some cases, the media is intended for real-time delivery, that is, to be played at the target device, essentially as it is ingested at the head-end, aside from some minimal latency incurred by buffering and processing. To stream content, the packaging server must keep up with the ingested video. That is, the head-end system(s) cannot take longer than one second to process one second of input video and generate the corresponding one second of output.

In some other contexts, there is no real-time constraint on encoding. For example, a documentary may not need to be viewed as it is produced. In this case, the packaging may be allowed to take considerably longer than real-time and may include more complex manipulations and analyses. For example, many commercial encoders (e.g. Windows Media Encoder) offer a two-pass encoding scheme for processing non-streaming content: during the first pass the video is analyzed and processed, and during the second pass the encoded (compressed) output is written. Two-pass encoding is not available in real-time streaming, because the content must be processed and written out as it is received.

As shown in more detail in FIG. 3, multiple parallel video streams 22 from video sources 23 (different TV channels, for instance) are handled by multiple encoders 40, 42, 44, each of which performs the encoding, analysis, generation of directives, and interleaving of the directives and the video frames for one of the streams. The encoded (compressed) streams 28 are transmitted (typically via IPv4/v6 multicast) into an Internet protocol encapsulator (IPE) 46, which multiplexes them together into an MPEG2 TS (transport stream) 50 that includes multiple concurrent streams of video, audio, and other data 52.

An electronic service guide (ESG) 56 provides programming information and a lookup table that allows the device to extract a user-selected service from the multiplex. The ESG is shown multiplexed into the MPEG-2 TS, but it may be conveyed in other ways over or separate from the broadcast channel. The ESG stream 73 that contains information for each of the services 74 is produced by an ESG generator 77 from programming information 79 provided manually by an operator, or automatically, for example, from an XMLTV/TMS feed. At the client 14, 18, the broadcast hardware receives the TS, selects a service by consulting the ESG, and plays out the corresponding stream(s).

Technologies for digital broadcast transmission to mobiles, for example, DVB-H, ISDB-T, DMB-T, and Media-FLO transmit the IP packet stream (possibly with further packaging) from multiple terrestrial towers, typically using a reserved part of the RF spectrum. The differences among these technologies are mostly at the physical and network level, and not significant to the system described here. Our discussion here also will not include discussions of the following issues that are not relevant to an understanding of the system described here: physical network issues including power conservation, protecting against Doppler interference, supporting handover/roaming preventing transmission errors using forward error correction (FEC), and broadcast network configuration including where to place transmitters.

Referring again to FIG. 3, and also to FIG. 5, handling of the broadcast signal at the client involves several steps. A receiver/tuner 60 selects a broadcast frequency, receives 104 the broadcast digital data stream 106, and delivers an MPEG-2 transport stream 50 containing, in interleaved form, the various media services 52, including audio, video, and the ESG 56.

A service 108 is then selected 110 from the multiplexed transport stream. A specific service may correspond to a number of separate logical streams 114, 116, 118 in the transport stream, for example, an audio stream, a video stream, an English closed-captioning stream, a Spanish closed-captioning stream, and so on. This is analogous to selecting a channel on a traditional television.

Decompression algorithms 120 extract the raw video signal 122, frame by frame and pixel by pixel, from the compressed video. Decompression algorithms 120 also extract the raw audio signal 126. A decryption algorithm 128 may also be applied to the IP packets based on a key 130 that is available only to those users who have subscribed and paid for the service.

The ESG stream 56 is decoded and presented 130 to the user in a TV-guide-like form: channels, schedule, and program descriptions. The user is also provided a "graphical user interface" (GUI) that offers the user the ability to select a service and view it.

We now focus on the video-resizing aspect of the system.

Shrinking the input frame to the required size, without altering the aspect ratio, may require generating a pixel value by averaging the value from a neighborhood of pixels. Common techniques for averaging, such as bicubic, bilinear, and nearest neighbor algorithms are supported by popular image-processing software tools, like Adobe Photoshop, and can also be executed in real-time on typical mobile video players.

The use of simple down-sampling assumes that it is preferable to show an entire video frame at reduced size and resolution rather than a zoomed-in part of that frame at a higher size and resolution. This assumption is not always justified. As shown in FIG. 6, simply down-sampling a frame 130 to a small size frame 132 is unsatisfactory because the subject (the news anchor) is already small in the frame 130 and becomes almost invisible in the small frame 132. Reducing the frame size by cropping and zooming to frame 134 gives a superior viewer experience.

As shown in FIG. 7, down-sampling can create artifacts such as blank borders 140 when the aspect ratio of the target device does not match that of the video signal. This artifact is known as letterboxing.

Feature-length movies typically are recorded with an aspect ratio between 1.78:1 and 2.35:1, which is optimal for movie-theater viewing. Viewing such a movie on a 4:3 (or even 16:9) TV (using a DVD, for example) produces letterboxing, but on a large enough TV screen, the effect is benign, because the blank lines at the top and bottom of the screen leave room for the wide-aspect-ratio video within the screen. Conversely, on the 2"-high screen of a cell phone, for example, letterboxing may reduce the height of the video to 1.5" or less, rendering it unacceptably small.

A technique known as pan and scan is used to correct letterboxing. Movie producers often embed pan and scan directives the digital stream of DVDs that instruct a TV how to extract a 4:3 rectangular viewing region from each frame. The director or a technician selects the optimal region on a frame-by-frame basis. A pan and scan directive is a pair of (x,y) values that specify the corners of the exact bounding box of the frame that is to be rendered on the display of the target device.

Because the embedded pan and scan directives typically anticipate a fixed target form factor, e.g., NTSC 4:3 at 640× 480 pixels, for a receiving device having a different form factor, the directives will not be suitable. And, because of the cost of creating pan and scan directives, they may be embedded in, for example, popular feature-length movies but not in a local news stream. In addition, as shown in FIG. 8, a panned and scanned frame 144 may drop important information that appeared in the original frame 142.

In the absence of useful pan and scan directives, or any directives at all, one strategy for rendering at the client to accommodate is to crop around the centroid of the frame. This works well when the subject is near the center of the frame but that is sometimes not the case. As shown in FIG. 9, two device screen sizes 146, 148 having a 16:9 aspect ratio and a 1:1 (square) aspect ratio are overlaid on the original frame 150. For both target devices, centroid-based cropping shaves off the top of the subject's head and the cathedral in the background.

Figure 10:
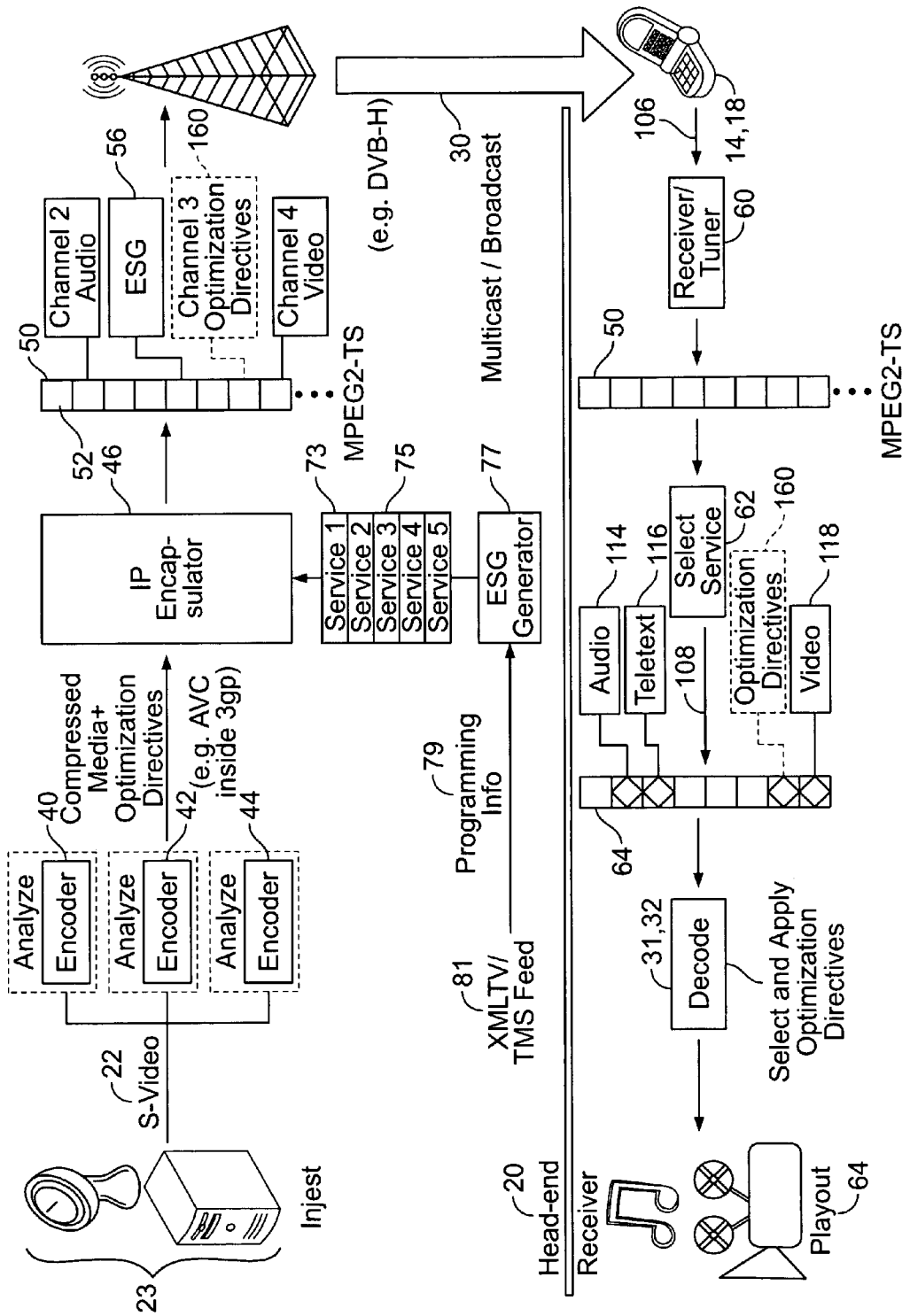

As shown in FIGS. 10 and 11, generating optimization directives 160 at the head end 20 can yield better presentation of video streams on client devices that have a variety of display formats and capabilities. At the head end, during video packaging, the uncompressed input video 23 is analyzed 162 (frame by frame, pixel by pixel, in raw uncompressed form) to determine an (x,y) point 164, 165 for each frame that best represents the centroid of the primary region of interest (ROI) in that frame. This (x,y) information is compressed and embedded 166 and embedded 166 as an optimization directive stream 160 into the broadcast stream 50.

At the client, the stream of (x,y) ROI locations 160 is used to generate, for each frame, a bounding box for cropping the frame and putting the (x,y) location at the center of each box.

There is one optimization directive stream for each video stream in the broadcast. For example, if there are eight parallel broadcast services, there will be eight optimization directive streams.

The optimization directive for each frame is a pair of numbers, (x,y), representing the location of the pixel that lies at the centroid of the primary ROI in that frame. The single (x,y) value provides information that allows a target device to create a bounding box around the centroid as appropriate for the resolution, size, and aspect ratio of the target device's display.

The resulting video stream and directives are decoded at the client to recover the uncompressed form, and the optimization directives guide the cropping of the frames performed by the client in a transform step.

Let (x,y) be the ROI for a frame, found in the optimization directive stream; $w_d$ be the width of device's screen; $h_d$ be its height; $w_f$ be the width of the input video frame, and $h_f$ be its height.

Using this notation, the transform (i.e., the cropping of the input frame) is as follows:

In general, select a $(w_d, h_d)$ rectangle from within the input frame, where the centroid of the selected rectangle is the point (x,y). However, to prevent the selected rectangle from containing blank space, adjust the step as follows to keep the selected rectangle fully contained within the frame:

if $y<h_d/2$ then $y=h_d/2$; if $y>h_f-h_d/2$ then $y=h_f-h_d/2$; if $x<h_w/2$ then $x=h_w/2$; and if $x>w_f-h_w/2$ then $x=w_f-h_w/2$.

This cropping operation is extremely simple to implement as a step in video rendering on a mobile device. For example, if the device has a recent version (e.g. 5.0) of the Microsoft Windows Mobile operating system, one may use the DirectShow multimedia feature and implement the cropping process as a Filter. The cropping Filter may be added to a processing chain (known as a graph in DirectShow) by invoking a GraphManager object and inserting the cropping Filter at the desired point in the flow. Now we return to the analysis step performed at the head end to determine the ROI locations for the frames of an input video stream. We describe several approaches for generating ROI information and a technique for consolidating these approaches into a single system.

1. Manually: A human operator manually inserts ROI information on a frame-by-frame basis, by using a computer workstation, an interactive application, and a pointing device such as a mouse. A similar setup is employed to create pan-and-scan directives.

2. By partitioning a video frame, pixel by pixel, into foreground and background partitions, the ROI centroid can be computed simply as the centroid of all the foreground pixels. Such partitioning is difficult and error-prone, but possible in the following cases, for example: Video that is recorded using multiple (stereo) cameras can be partitioned at high-quality and in real-time as explained in M. Harville, G. Gordon, J. Woodfill, "*Foreground Segmentation Using Adaptive Mixture Models in Color and Depth*", *Proceedings of the IEEE Workshop on Detection and Recognition of Events in Video*, (Vancouver, Canada), July 2001 and illustrated in FIG. 12.2. Video that is encoded using a layered coding technique (for example MPEG-4) enables video to be encoded as objects that can be tracked as they move temporally across frames.

3. When the input signal contains pan-and-scan vectors, a frame-by-frame ROI location (x,y) can be calculated by averaging the $(x_1,y_1)$ and $(x_2,y_2)$ pan and scan vectors as follows: $x=(x_1+x_2)/2$ and $y=(y_1+y_2)/2$.

4. Faces can be identified and tracked in real-world video sequences, as described in P. Viola and M. Jones, "*Robust Real-time Face Detection*," in Int'l Journal of Computer Vision 57(2)137-154, 2001, and illustrated in two examples in FIG. 13. A face-detection system may be used as the first stage in an ROI tracker followed by computing the center of mass of all the detected faces to be used as the frame's ROI. Face detection can eliminate head-cropping artifacts of the kind illustrated in FIG. 9.

5. MPEG motion vectors (embedded in the compressed video stream) may be analyzed to determine where the moving objects are in each frame, and then to assign those objects as the region of interest. United States patent application 20050099541 describes a technique for generating pan-and-scan directives based on motion vectors. When it can be determined that a large convex region is moving monolithically and above a certain velocity threshold, the video is panned in the direction of motion.

6. When synthetic computer-generated text is inserted in the video stream during production, if the video frame is proportionally down-sampled for small-screen devices, smaller-font text may become illegible, as shown in frame 180 of FIG. 14. During analysis, the head-end examines the input frames for small-font text that appears on the periphery of the frame, and uses that information to guide the ROI tracker. All else being equal, a small-font ticker on the bottom of the screen would shift the ROI further up in the video frame.

Locating text within video has been discussed in, e.g., T. Sato, T. Kanade, E. Hughes, and M. Smith, "Video OCR for Digital News Archives", IEEE, Workshop on Content-Based Access of Image and Video Databases (CAIVD'98), Bombay, India, pp.52-60, January, 1998, using a combination of heuristics to detect text. These include looking for high-contrast regions and sharp edges. The better-performing techniques typically integrate results over a sequence of frames and apply multiple predicates (detectors) to the image. FIG. 15, from IEEE Int'l Workshop on Content-based access of image and video databases (ICCV98)—M Smith and T Kanade, shows the output of a joint text/face detector developed at Carnegie Mellon University.

We turn now to discuss certain details of some implementations of the system.

The several analysis techniques described above can be combined in a process, illustrated in FIG. 16, the output of which is a stream of (x,y) ROI locations, one per frame. The input video is searched 200 for the presence of pan and scan vectors. If found, the vectors are used to generate 202 the ROI values. If the input video contains layered coding 204, segmentation is performed 206 using the layer information. If the video is recorded in stereo 208, the stereo information is used 210. Otherwise, if none of the above, face detection and motion analyis 212, 214 can be applied. Text detection 216 can then be used to adjust the ROI value.

We now describe certain implementation details.

Pattern classification systems such as object detectors may produce a confidence level for the results that they generate. If the confidence level is low, the system may default to the centroid of the original frame, rather than accepting a "wild guess." (This concept is suggested in patent application 20050099541.)

Discontinuous jumping around of the ROI from frame to frame would create an unpleasant user experience. The packaging process implements a hysteresis-type filter that dampens the speed of reaction a moving ROI. Instead of jumping fifty pixels at once, for example, the ROI is moved incrementally towards the target position. If, in the next frame the ROI is the same, the tracker will again move incrementally towards it.

The device owner is given the option to enable or disable the customization feature. When customization is on, the optimization directives are applied. When off, they are ignored and the device instead performs its default frame rendering, for example, down-sampling and cropping around the center. The option can be chosen on a per-channel, per-program, and per-minute basis.

The system could be used for to enable the display device to optimize the frames for any arbitrary geometry, for example, any arbitrary aspect ratio and even any arbitrary shape: oval-shaped, diamond-shaped, or any convex or other region. All that is required is that the client know how to crop an input video frame to its own geometry Other implementations are within the scope of the following claims.

The application of the system is not limited to handheld, portable, or mobile devices but could also extend to any small-screen device, including a device that could be mounted on a wall or dashboard or embedded in another device like a thermostat.

Although the system has been described in the context of digital broadcast to mobile devices, it could be applied to a wide variety of other platforms and in other contexts, for example, internet-based multicasting which does not use terrestrial broadcast technology to deliver the content, but rather uses traditional Internet structures—routers, switches, and last-mile technology such as WiFi, DSL, cable modems. The intermediate routers between the head-end and client would be multicast-enabled.

It is possible that aspects and features of the system could be used for content that is other than video, for communication systems that are other than broadcast, and for techniques other than cropping.

The device to which the video is being sent could be other than a telephone, for example, any hand-held or non hand-held device, for example, a personal digital assistant or a display mounted in a car.

The invention claimed is:

1. A method comprising
    sending to a handheld device that has a display, a digital video frame that has an original pixel resolution, and a region of interest,
    the display of the handheld device having a substantially lower pixel resolution than the original pixel resolution of the digital video frame, and
    also sending to the handheld device a directive that is associated with the region of interest and from which the hand-held device can display the region of interest at the original pixel resolution and centered in the display of the handheld device, without the handheld device requiring any other information about the shape of the region of interest.

2. The method of claim 1 in which the directive comprises a centroid of the region of interest.

3. The method of claim 1 also including sending the directive by embedding the directive in a video that includes the digital video frame.

4. The method of claim 1 in which the region of interest comprises foreground pixels of the digital video image.

5. The method of claim 1 in which the region of interest is based on a moving object or region in a video that includes the digital video frame.

6. The method of claim 1 in which the region of interest is based on pan and scan vectors of a video that includes the digital video frame.

7. The method of claim 1 in which the region of interest is based on a face appearing in a video that includes the digital video frame.

8. The method of claim 1 in which the region of interest is based on the existence of small-font text on a periphery of the digital video frame.

9. The method of claim 1 in which the lower pixel resolution comprises ¼ or fewer of the number of pixels in the original pixel resolution.

10. The method of claim 1 in which the lower pixel resolution is sufficiently lower than the original pixel resolution so that if the entire digital video frame were displayed on the handheld device, details of interest in the region of interest would not be acceptably visible to a user of the handheld device.

* * * * *